US010343644B2

(12) United States Patent
Dry et al.

(10) Patent No.: US 10,343,644 B2
(45) Date of Patent: Jul. 9, 2019

(54) SEAT WITH RESTRAINT SYSTEM

(71) Applicant: Ford Global Technologies, LLC, Dearborn, MI (US)

(72) Inventors: Alan George Dry, Grosse Pointe Woods, MI (US); Johnathan Andrew Line, Northville, MI (US); Brian Robert Spahn, Plymouth, MI (US); Benjamin Yilma, Canton, MI (US); Marcos Silva Kondrad, Macomb Township, MI (US); S. M. Akbar Berry, Windsor (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 106 days.

(21) Appl. No.: 15/727,945

(22) Filed: Oct. 9, 2017

(65) Prior Publication Data

US 2019/0106077 A1 Apr. 11, 2019

(51) Int. Cl.
| | | |
|---|---|---|
| *B60R 21/26* | (2011.01) | |
| *B60N 2/75* | (2018.01) | |
| *B60R 21/207* | (2006.01) | |
| *B60R 21/013* | (2006.01) | |
| *B60R 21/01* | (2006.01) | |

(52) U.S. Cl.
CPC .............. *B60R 21/26* (2013.01); *B60N 2/753* (2018.02); *B60N 2/79* (2018.02); *B60R 21/207* (2013.01); *B60R 21/013* (2013.01); *B60R 2021/01034* (2013.01); *B60R 2021/01286* (2013.01)

(58) Field of Classification Search
CPC ............ B60R 21/26; B60N 2/79; B60N 2/753
See application file for complete search history.

(56) References Cited

U.S. PATENT DOCUMENTS

| | | | |
|---|---|---|---|
| 3,981,518 A | 9/1976 | Pulling | |
| 5,492,361 A * | 2/1996 | Kim | ........................ B60R 21/02 280/730.1 |
| 5,564,736 A | 10/1996 | Kim | |
| 5,730,458 A * | 3/1998 | Byon | ....................... B60R 19/00 280/730.2 |
| 9,738,188 B2 * | 8/2017 | Honda | .................. B60N 2/4235 |
| 10,035,441 B1 * | 7/2018 | Patel | ....................... B60N 2/753 |
| 2002/0063453 A1 * | 5/2002 | Terry | ........................ A47C 7/38 297/227 |
| 2017/0072893 A1 | 3/2017 | Fujiwara | |
| 2018/0281723 A1 * | 10/2018 | Nagasawa | ............... B60R 21/18 |
| 2018/0281725 A1 * | 10/2018 | Nagasawa | ............... B60R 21/18 |
| 2018/0281730 A1 * | 10/2018 | Nagasawa | ........... B60R 21/0134 |

FOREIGN PATENT DOCUMENTS

| | | | |
|---|---|---|---|
| DE | 10253472 A1 | 6/2004 | |
| JP | 4172374 B2 | 10/2008 | |
| JP | 2016074244 A | 5/2016 | |
| TW | I337146 B | 11/1997 | |

\* cited by examiner

*Primary Examiner* — Faye M Fleming
(74) *Attorney, Agent, or Firm* — Frank A. MacKenzie; Bejin Bieneman PLC

(57) ABSTRACT

A seat includes a seatback, two armrest portions, and two airbags. Each armrest portion is rotatably coupled to the seatback about a generally vertical axis from a stowed position elongated in a forward direction to a deployed position extending in front of the seatback. Each airbag is fixed to one of the armrest portions and inflatable to an inflated position in which one of the airbags is disposed in front of the other of the airbags relative to the seatback.

20 Claims, 10 Drawing Sheets

SEAT WITH RESTRAINT SYSTEM

BACKGROUND

Vehicles are equipped with airbags. In the event of an impact, an inflator activates and provides inflation medium to the airbags, and the airbags pressurize and act as cushions for occupants during the impact. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side air curtains mounted in the roof rails.

DETAILED DESCRIPTION

Figure 1:
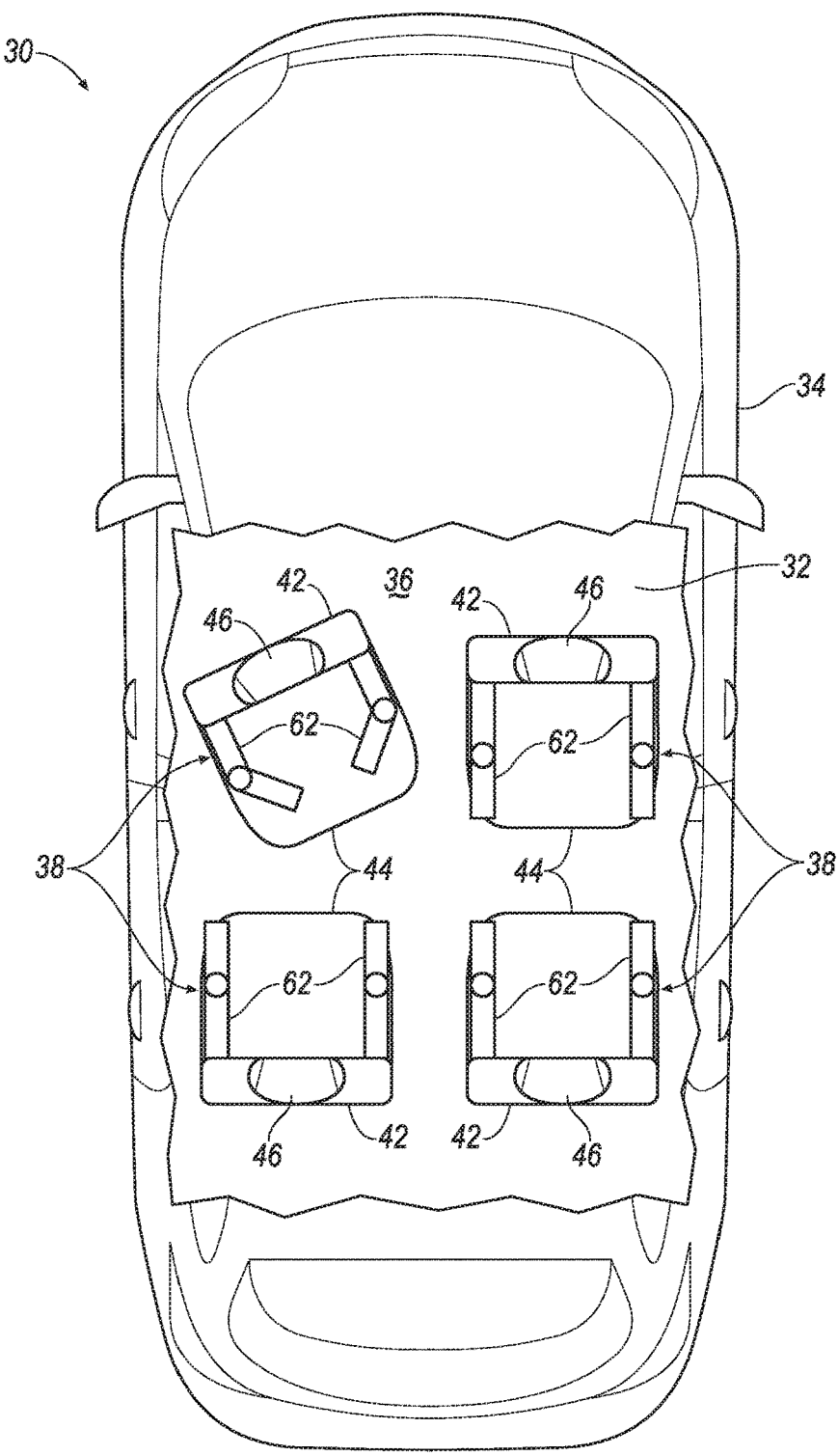
FIG. 1 is a top view of a vehicle with a roof removed for illustration.
Figure 2:
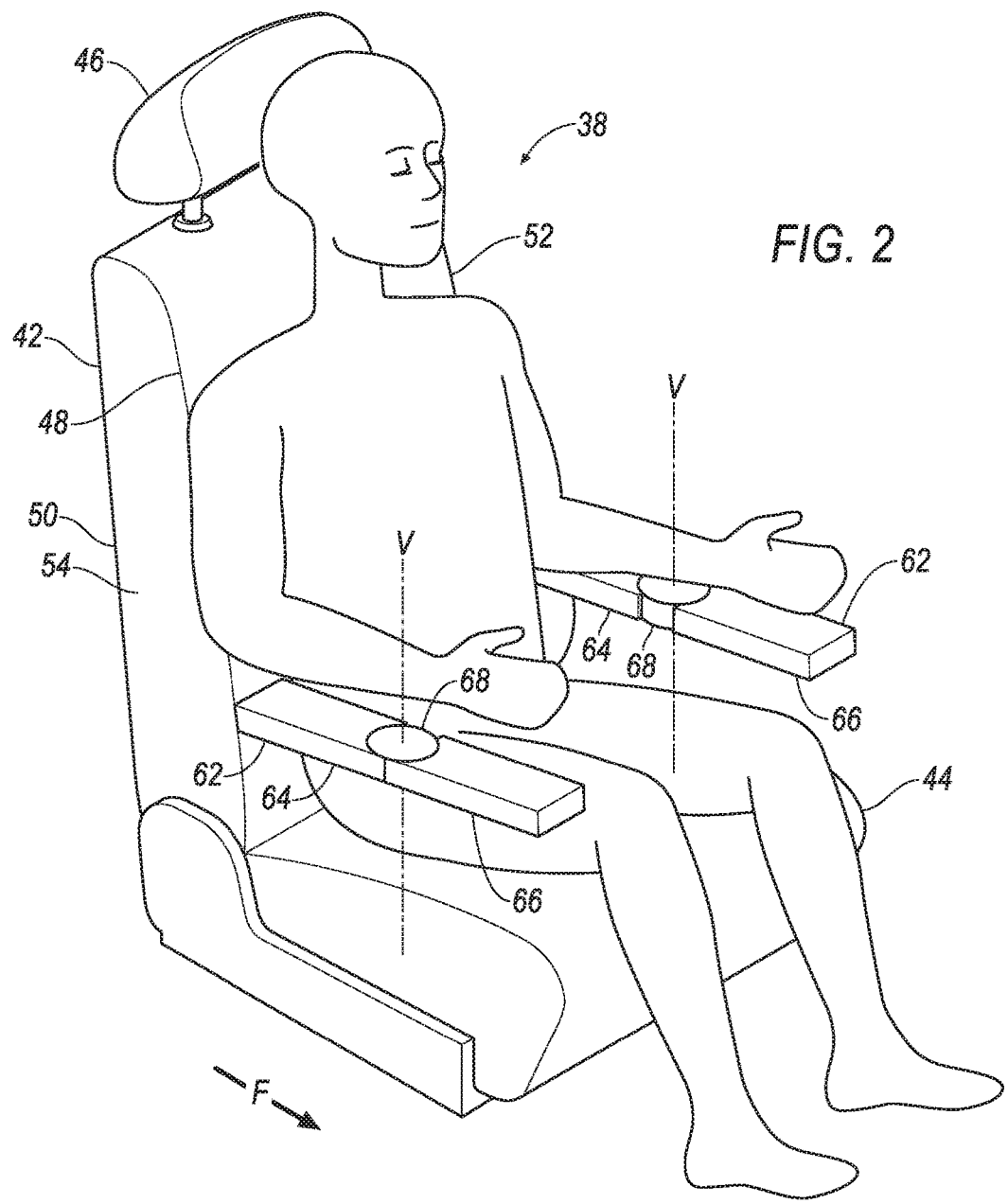
FIG. 2 is a perspective view of a seat of the vehicle.
Figure 5:
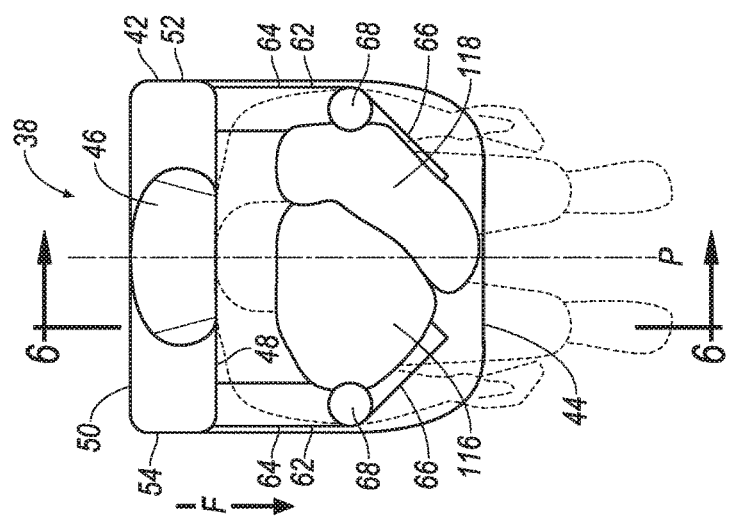
FIG. 5 is a top view of the seat with the armrest portions in the deployed position and airbags in an inflated position.
Figure 4:
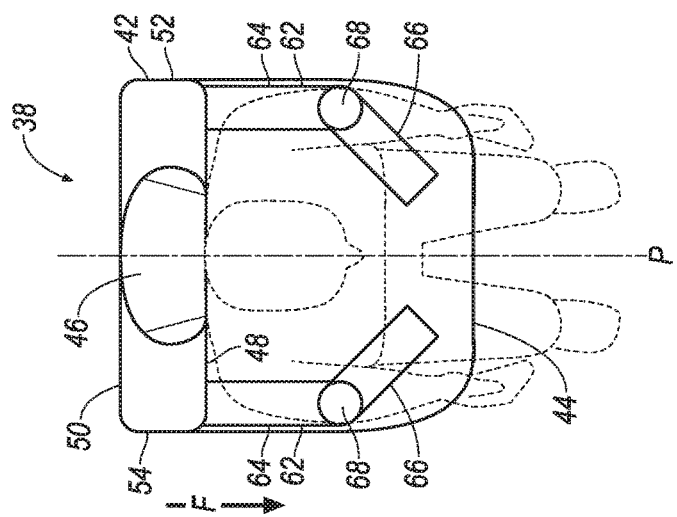
FIG. 4 is a top view of the seat with the armrest portions in a deployed position.
Figure 3:
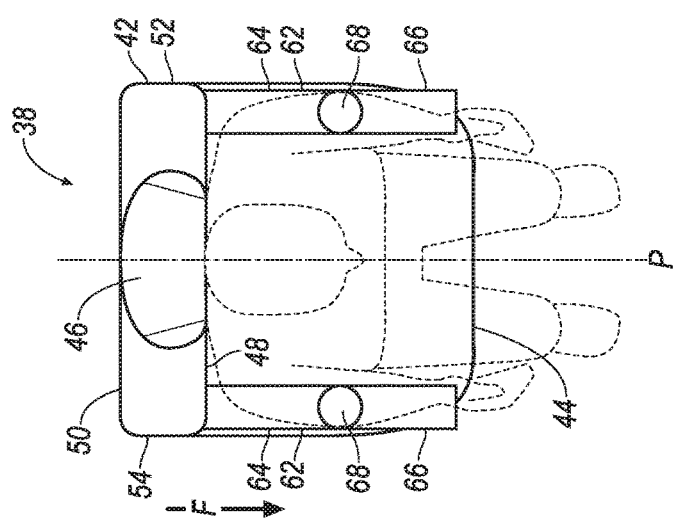
FIG. 3 is a top view of the seat with armrest portions in a stowed position.
Figure 6:
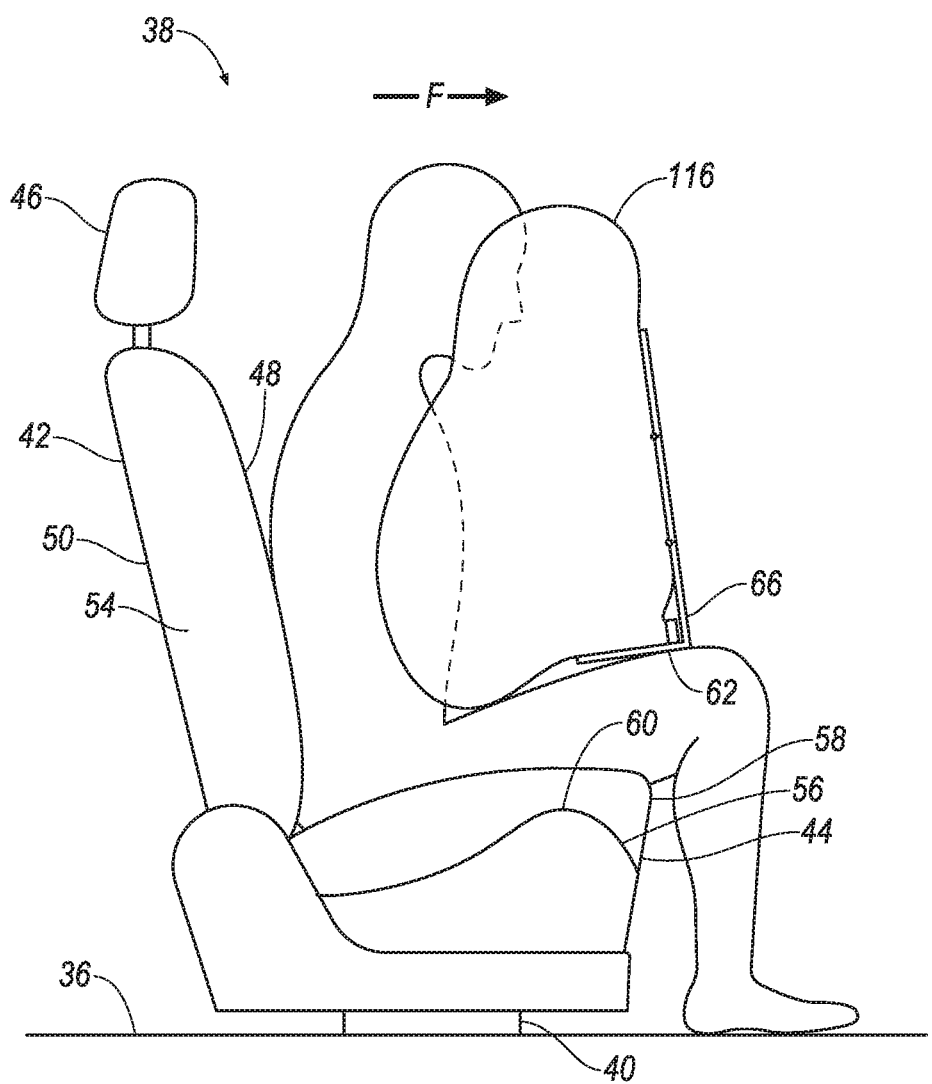
FIG. 6 is a side cross-sectional view of the seat with the airbags in the inflated position.
Figure 7:
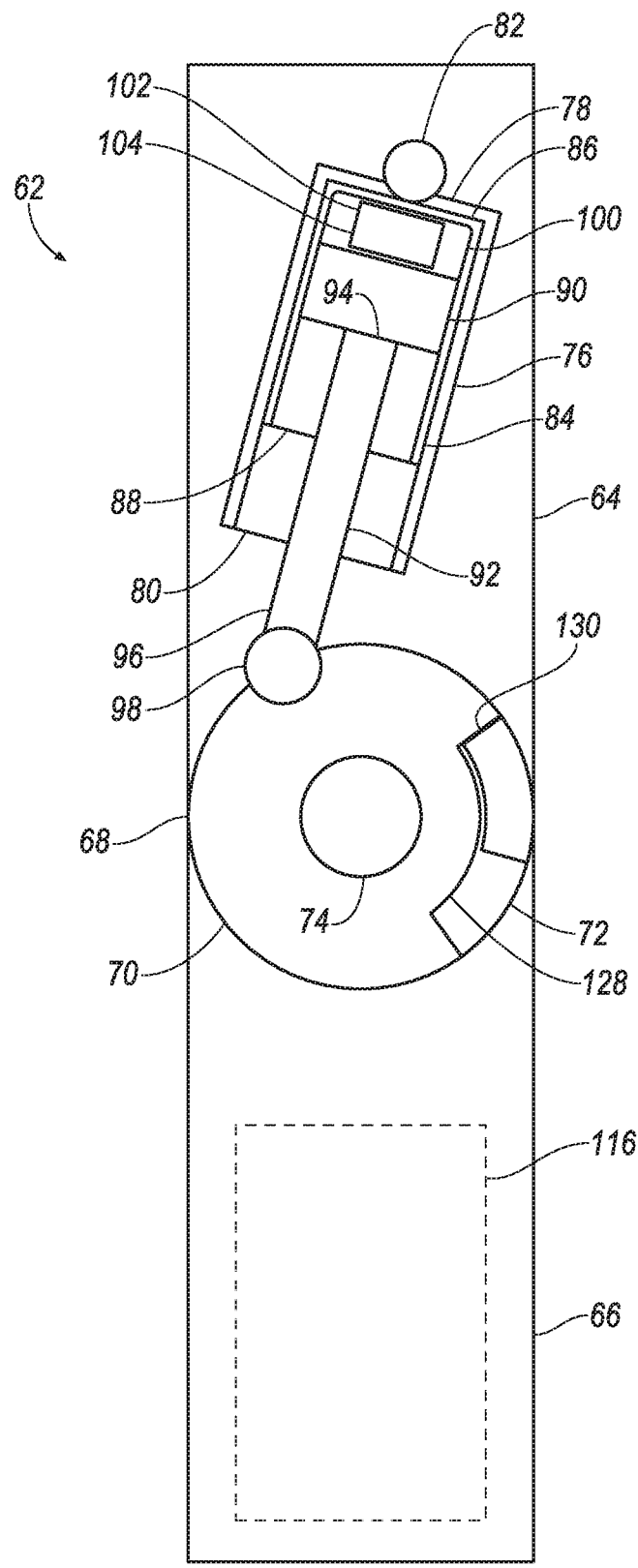
FIG. 7 is a partially cut-away view of an armrest of the seat with the armrest portion in the stowed position.
Figure 8:
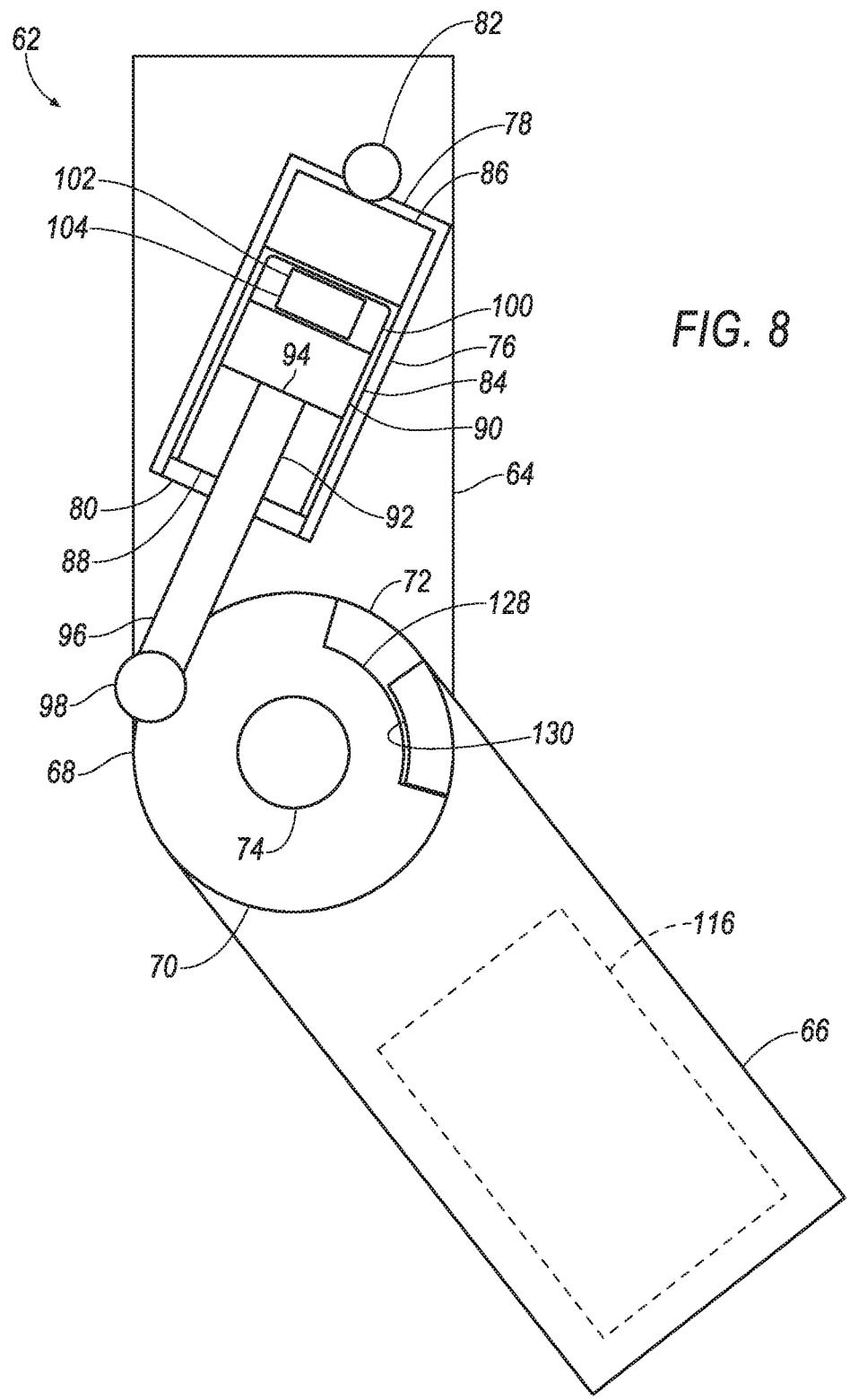
FIG. 8 is the partially cut-away view of the armrest with the armrest portion in the deployed position and a gas chamber undischarged.
Figure 9:
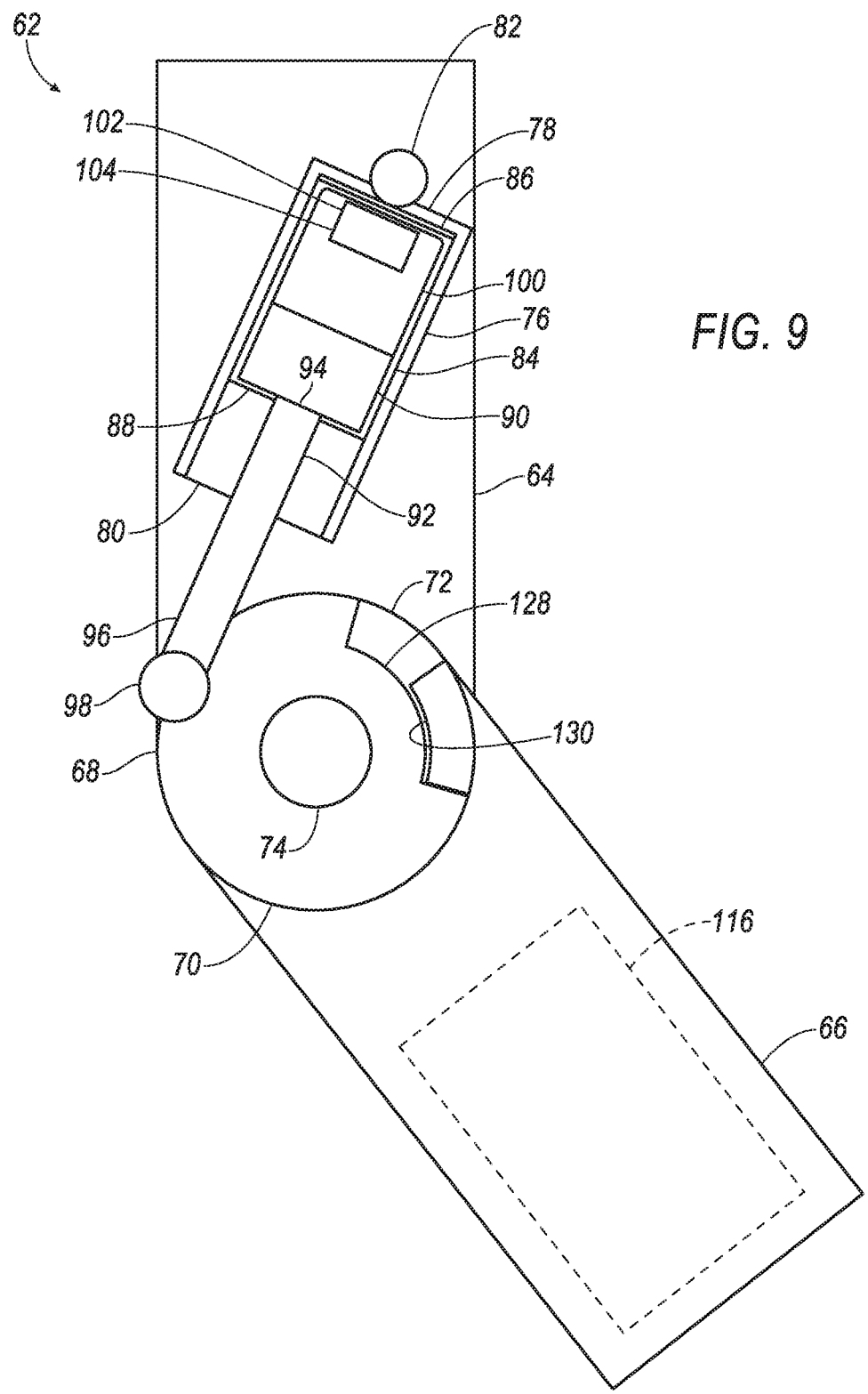
FIG. 9 is the partially cut-away view of the armrest with the armrest portion in the deployed position and the gas chamber discharged.
Figure 10:
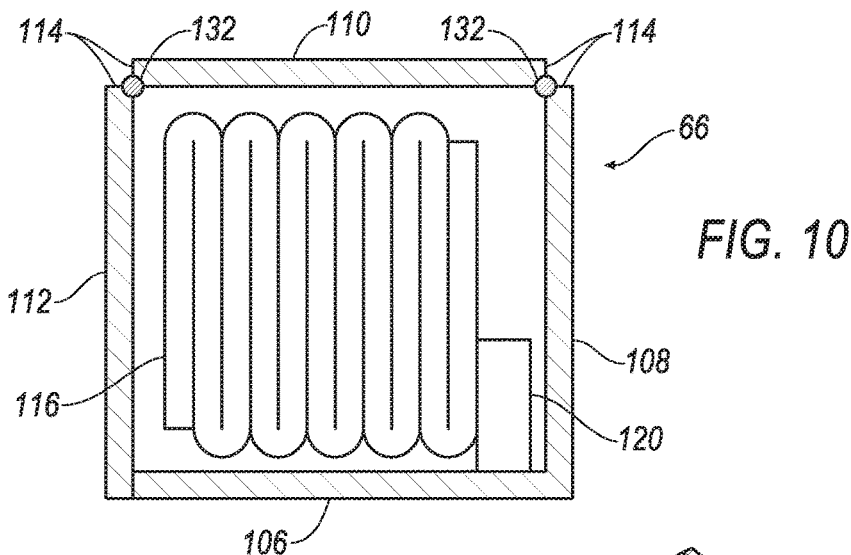
FIG. 10 is a cross-sectional view of the armrest portion with the airbag in the uninflated position.
Figure 11:
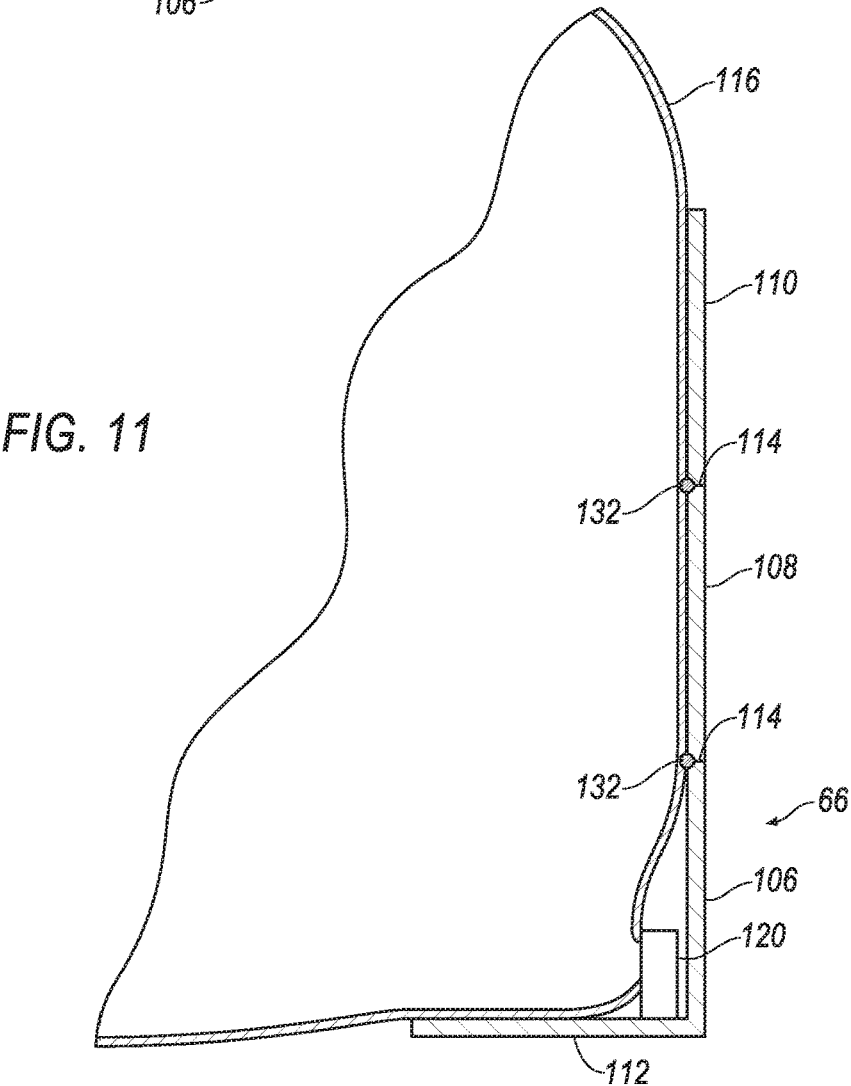
FIG. 11 is a cross-sectional view of the armrest portion with the airbag in the inflated position.
Figure 12:
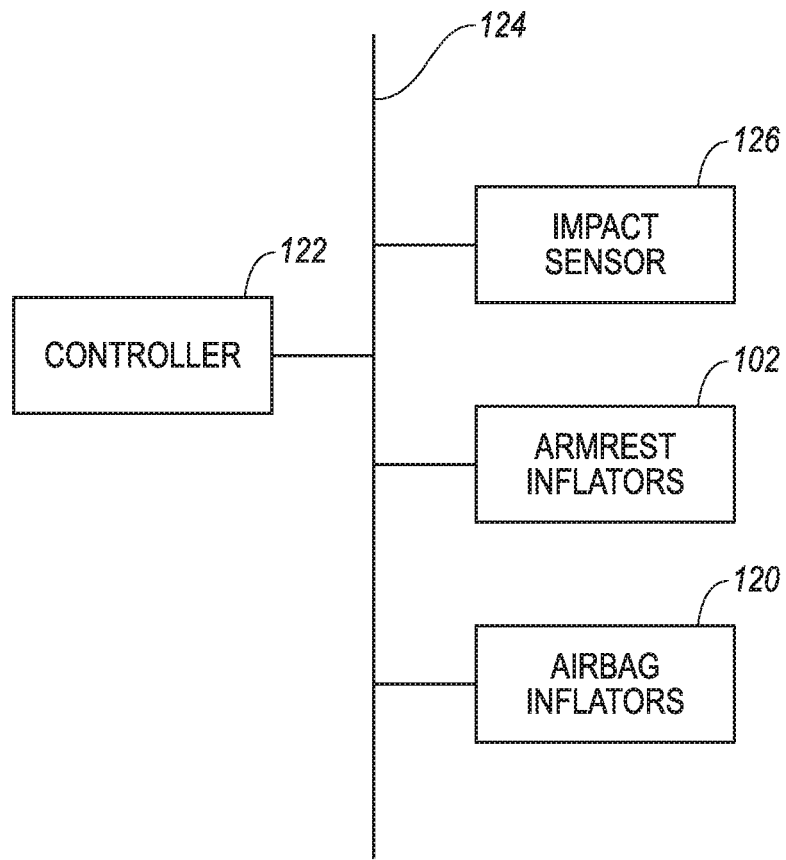
FIG. 12 is a block diagram of a control system for the seat.

A seat includes a seatback, two armrest portions, and two airbags each fixed to one of the armrest portions. Each armrest portion is rotatably coupled to the seatback about a generally vertical axis from a stowed position elongated in a forward direction to a deployed position extending in front of the seatback. Each airbag is inflatable to an inflated position in which one of the airbags is disposed in front of the other of the airbags relative to the seatback.

The armrest portions may be front armrest portions, and the seat may include two back armrest portions fixed relative to the seatback, and each front armrest portion may be rotatably coupled to one of the back armrest portions.

The seat may include two inflators, each positioned to rotate one of the armrest portions to the deployed position upon discharge. The inflators may include a first inflator and a second inflator, and the seat may include a piston cylinder and a piston head disposed in the piston cylinder, and a gas-expansion chamber may be enclosed by the piston head and the piston cylinder, and the inflator may be disposed in the gas-expansion chamber. The seat may include a sleeve slidably disposed in the piston cylinder, and the piston head may be slidably disposed in the sleeve. The gas-expansion chamber may be enclosed by the sleeve and the piston head. The sleeve may include a first end face and a second end face spaced from the first end face, and the gas-expansion chamber may be disposed between the piston head and the first end face. The piston head may be coupled to one of the armrest portions, and a position of the piston head relative to the piston cylinder may correspond to a position of the one of the armrest portions relative to the seatback.

The armrest portions may include a first armrest portion and a second armrest portion, and the seat may include a piston rod fixed to the piston head and rotatably coupled to the first armrest portion.

The piston cylinder may be rotatably coupled to the seatback.

The armrest portions may be rotatable between the stowed position and the deployed position without discharging the inflators.

The inflators may be armrest inflators, and the seat may include airbag inflators each fluidly connected to one of the airbags, and a controller in communication with the armrest inflators and the airbag inflators. The controller may be programmed to instruct the armrest inflators to discharge and to instruct the airbag inflators to discharge at a preset time after the armrest inflators discharge.

Each armrest portion may include a bottom panel, an outboard panel, a top panel, and an inboard panel, and the top panel and outboard panel may be hingedly coupled for each armrest portion. The inboard panel and the top panel may be hingedly coupled for each armrest portion. The inboard panel and the bottom panel may be releasably connected for each armrest portion. The top panel and the inboard panel may each be rotatable from an undeployed position to a deployed position. The top panel and the inboard panel may each have a rotational range of motion, and each range of motion may stop at the deployed position.

The seat may include two stops fixed relative to the seatback, wherein each armrest portion includes a cutout engaged with one of the stops. The cutouts may be sized to permit the armrest portions to rotate between the stowed position and the deployed position and to stop the armrest portions from rotating past the stowed position and past the deployed position.

A seat 38 with attached components as described herein provides the benefits of airbag protection regardless of the orientation of the seat 38 in a vehicle 30. In the event of an impact, airbags 116, 118 can deploy and may prevent a secondary impact between an occupant sitting in the seat 38 and a component of a passenger cabin 32 of the vehicle 30, such as a dashboard, window, or pillar. Moreover, also in the event of an impact, the airbags 116, 118 may prevent or decrease the severity of loose objects in the passenger cabin 32 striking the occupant. The airbags 116, 118 may reduce the likelihood that the occupant "submarines" during an impact, i.e., slides forward along a seat bottom 44 out of position. The seat 38 having the airbags 116, 118 may thus reduce injuries to the occupant during an impact. At the same time, the seat 38 allows the occupant greater freedom of movement by possibly replacing seatbelts. Armrests 62 holding the airbags 116, 118 are spaced from the occupant and may be deployed into position in the event of an impact.

With reference to FIG. 1, a vehicle 30 may be an autonomous vehicle. A computer (not shown) can be configured to operate the vehicle 30 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering; semi-autonomous operation means the computer controls one or two of the propulsion, brake system, and steering and a human driver controls the remainder; and nonautonomous operation means the human driver controls the propulsion, brake system, and steering.

The vehicle 30 includes a passenger cabin 32. The passenger cabin 32 houses occupants, if any, of the vehicle 30. The passenger cabin 32 may be surrounded and/or defined by a body 34 of the vehicle 30. A floor 36 may define a bottom of the passenger cabin 32. The passenger cabin 32 includes one or more seats 38 for occupants of the vehicle 30 disposed on the floor 36 and coupled to the floor 36.

The seats 38 may be bucket seats, as shown in the Figures, bench seats, or another type of seat. Each seat 38 defines a forward direction F as a direction faced by an occupant sitting in the seat 38. The seats 38 may be rotatably coupled to the floor 36 via, e.g., a pedestal 40. The seats 38 may each be rotatable about a generally vertical axis relative to the passenger cabin 32. Each seat 38 may face a vehicle-forward direction, a vehicle-rearward direction, or any direction in between. Whichever direction the seat 38 is facing is the forward direction F relative to the seat 38.

The seat 38 may include a seatback 42, a seat bottom 44, and a headrest 46. The headrest 46 may be supported by the seatback 42 and may be stationary or movable relative to the seatback 42. The seatback 42 may be supported by the seat bottom 44 and may be stationary or movable relative to the seat bottom 44. The seatback 42, the seat bottom 44, and/or the headrest 46 may be adjustable in multiple degrees of freedom. Specifically, the seatback 42, the seat bottom 44, and/or the headrest 46 may themselves be adjustable, in other words, adjustable components within the seatback 42, the seat bottom 44, and/or the headrest 46, and/or may be adjustable relative to each other. The seatback 42 includes a front side 48 that the occupant contacts when sitting in the seat 38, a back side 50 facing the opposite direction as the front side 48, and a left side 52 and a right side 54 facing laterally and connecting the front side 48 and the back side 50. The seatback 42 defines a plane P extending vertically and forward relative to the seatback 42 through a center of the seatback 42.

The seat bottom 44 may include an anti-submarining ramp 56 and a cushion 58. The cushion 58 may cover the anti-submarining ramp 56. The anti-submarining ramp 56 may be stiffer, i.e., require a greater force to compress, than the cushion 58. The anti-submarining ramp 56 may slope upward in a seat-forward direction. The anti-submarining ramp 56 may include a crest 60 at a maximum height of the anti-submarining ramp 56, and the crest 60 may be disposed more than halfway forward relative to the seat bottom 44. The crest 60 of the anti-submarining ramp 56 may be positioned below thighs and forward of hips of an occupant who is 50th percentile in height. The anti-submarining ramp 56 may extend across a front end of the seat bottom 44 in a lateral direction relative to the seat 38. The anti-submarining ramp 56 may be positioned to reduce a likelihood that the occupant "submarines," i.e., slides below restraints during an impact.

The seat 38 includes two armrests 62 attached to the seatback 42. The armrests 62 may be elongated from the left side 52 and the right side 54 of the seatback 42. The armrests 62 may be positioned at a height relative to the seatback 42 at which an occupant can rest their forearms on the armrests 62. Each armrest 62 may include a back armrest portion 64 and a front armrest portion 66. The armrests 62 may be symmetrical about the plane P (other than the airbags 116, 118), and the components below described as making up one of the armrests 62 may make up the other of the armrests 62 as well. Common numerals identify common features of the armrests 62.

The back armrest portions 64 are fixed relative to the seatback 42. The back armrest portions 64 may be elongated from the left side 52 and the right side 54 of the seatback 42. The back armrest portions 64 may be nonadjustable to the occupant; that is, the occupant cannot move the back armrest portions 64 relative to the seatback 42.

The front armrest portions 66 are directly coupled to the back armrest portions 64 and indirectly coupled to the seatback 42. Each front armrest portion 66 is elongated from one of the back armrest portions 64. The front armrest portions 66 may be free-hanging, i.e., cantilevered from the back armrest portions 64, i.e., attached to and elongated from the back armrest portions 64 and not directly attached to any other component.

Each front armrest portion 66 is rotatably coupled to one of the back armrest portions 64, and the front armrest portions 66 are indirectly rotatably coupled to the seatback 42. The front armrest portions 66 are rotatable relative to the back armrest portions 64 about generally vertical axes V between a stowed position and a deployed position. Specifically, the back armrest portions 64 and the front armrest portions 66 are generally horizontally arranged to support the arms of an occupant and may be slightly offset from the true horizontal, for example, to be in a position to comfortably support the arms of the occupant. Accordingly, the front armrest portions 66 are rotatable about the generally vertical axes V, i.e., true vertical or slightly offset from true vertical, for example, to accommodate the horizontal arrangement described immediately above.

The front armrest portions 66 in the stowed position are elongated in a forward direction relative to the seatback 42. The front armrest portions 66 in the stowed position may be elongated in the same direction as the back armrest portions 64 are elongated. The front armrest portions 66 in the stowed position may be parallel to each other. The front armrest portions 66 in the deployed position extend in front of the seatback 42. The front armrest portions 66 in the deployed position may be angled inboard from the back armrest portions 64 relative to the seatback 42. Each front armrest portion 66 in the deployed position may form an obtuse angle with one of the back armrest portions 64.

Each armrest 62 may include a pivot 68 rotatably coupling the front armrest portion 66 and the back armrest portion 64. The pivot 68 may have a front pivot portion 70 fixed relative to the front armrest portion 66, a back pivot portion 72 fixed relative to the back armrest portion 64, and a pin 74 connecting the front pivot portion 70 and the back pivot portion 72. The pin 74 may allow rotational motion of the front pivot portion 70 relative to the back pivot portion 72. The front pivot portion 70 may be integral with and part of the front armrest portion 66, and the back pivot portion 72 may be integral with and part of the back armrest portion 64.

Each armrest 62 includes a cutout 128 and a stop 130 engaged with the cutout 128. The stop 130 is included in one of the back armrest portion 64 and the front armrest portion 66, and the cutout is included in the other of the back armrest portion 64 and the front armrest portion 66. For example, the stop 130 may be included in the back armrest portion 64, such as back pivot portion 72; and the cutout 128 may be included in the front armrest portion 66, such as the front pivot portion 70. The cutout 128 may be shaped as an arc of circle centered in the pin 74 and on the generally vertical axis V. The cutout 128 may be sized to permit the front armrest portion 66 to rotate between the stowed position and the deployed position and to stop the armrest portion from rotating past the stowed position and past the deployed position. For example, when the front armrest portion 66 is in the stowed position, the stop 130 is contacting one end of the cutout 128, and when the front armrest portion 66 is in the deployed position, the stop 130 is contacting the other end of the cutout 128.

A piston cylinder 76 is rotatably coupled to the seatback 42 and disposed in each of the back armrest portions 64. The piston cylinder 76 has a tubular shape elongated from a closed end 78 to an open end 80. The closed end 78 of the piston cylinder 76 may be connected to a piston-cylinder hinge 82. The piston-cylinder hinge 82 may have a fixed position relative to the seatback 42. The piston cylinder 76 may be freely rotatable about the piston-cylinder hinge 82.

A sleeve 84 is slidably disposed in the piston cylinder 76. The sleeve 84 may have a tubular shape elongated from a first end face 86 to a second end face 88 spaced from the first end face 86. (The adjectives "first" and "second" are used throughout this document as identifiers and are not intended to signify importance or order.) The tubular shape may be engageable with an inside of the piston cylinder 76 so that the sleeve 84 is slidable only in the direction of elongation of the piston cylinder 76. For example, the sleeve 84 may be cylindrical with an outside diameter slightly smaller than an inside diameter of the piston cylinder 76. The first end face 86 may be closed. The second end face 88 may be open.

A piston head 90 is slidably disposed in the piston cylinder 76, more specifically, in the sleeve 84. A cross-sectional shape of the piston head 90 may be engageable with an inside of the sleeve 84 so that the piston head 90 is slidable only in the direction of elongation of the sleeve 84. For example, the cross-sectional shape of the piston head 90 may be circular with a diameter slightly smaller than an inside diameter of the sleeve 84.

The piston head 90 is coupled to the front armrest portion 66 via, e.g., a piston rod 92. The piston rod 92 is elongated from a first end 94 fixed to the piston head 90 to a second end 96 rotatably coupled to the front armrest portion 66, e.g., the front pivot portion 70. The second end 96 of the piston cylinder 76 may be connected to a piston-rod hinge 98. The piston-rod hinge 98 may have a fixed position relative to the front pivot portion 70. The piston rod 92, and thus the piston head 90, may be freely rotatable about the piston-rod hinge 98.

A gas-expansion chamber 100 is enclosed by the piston head 90 and the piston cylinder 76, more specifically, by the piston head 90 and the sleeve 84. The gas-expansion chamber 100 is disposed between the piston head 90 and the first end face 86 of the sleeve 84. The piston head 90 and the sleeve 84 define the gas-expansion chamber 100. The piston head 90 may be fit in the sleeve 84 sufficiently close to prevent gas in the gas-expansion chamber 100 from escaping from the gas-expansion chamber 100.

An armrest inflator 102 is positioned to rotate the front armrest portion 66 to the deployed position upon discharge. The armrest inflator 102 is disposed in the gas-expansion chamber 100. The armrest inflator 102 may be or may include a charge 104 combustible to produce a gas. The charge 104 may be formed of a solid mixture of substances that, when ignited, react to produce the gas. For example, the charge 104 may be formed of sodium azide ($NaNO_3$), potassium nitrate ($KNO_3$), and silicon dioxide ($SiO_2$), which react to form nitrogen gas ($N_2$).

A position of the piston head 90 relative to the piston cylinder 76 corresponds to a position of the front armrest portion 66 relative to the seatback 42. The front armrest portion 66 is rotatable from any position to the deployed position by discharging the armrest inflator 102, and the front armrest portion 66 is rotatable between the stowed position and the deployed position without discharging the armrest inflator 102. The front armrest portion 66 may be rotated by an occupant of the seat 38, in which case as the front armrest portion 66 rotates, the sleeve 84 slides in the piston cylinder 76 and the piston head 90 is stationary relative to the sleeve 84. If the armrest inflator 102 is discharged, the pressure from the expanding gas in the gas-expansion chamber 100 pushes the first end face 86 of the sleeve 84 to the closed end 78 of the piston cylinder 76 and pushes the piston head 90 toward the second end face 88 of the sleeve 84.

The front armrest portion 66 includes a bottom panel 106, an outboard panel 108, a top panel 110, and an inboard panel 112. The top panel 110 and the outboard panel 108 are hingedly coupled with a panel hinge 132. The inboard panel 112 and the top panel 110 are hingedly coupled with a panel hinge 132. The inboard panel 112 and the bottom panel 106 are releasably connected. The bottom panel 106 and the outboard panel 108 are attached.

The top panel 110 is rotatable from an undeployed position to a deployed position relative to the outboard panel 108. The top panel 110 has a rotational range of motion, which stops at the deployed position. The inboard panel 112 is rotatable from an undeployed position to a deployed position relative to the top panel 110. The inboard panel 112 has a rotational range of motion, which stops at the deployed position. Panel stops 114 may be positioned to prevent the top panel 110 and the inboard panel 112 from rotating past the deployed position outside the range of motion. The panel stops 114 may be fixed to the outboard panel 108, the top panel 110, and/or the inboard panel 112.

The seat 38 includes two airbags 116, 118, a first airbag 116 and a second airbag 118, each fixed to one of the front armrest portions 66. The first airbag 116 is inflatable from an uninflated position to an inflated position. The first airbag 116 in the uninflated position is disposed in the front armrest portion 66 and covered and concealed by the panels 106, 108, 110, 112 of the first armrest portion. The first airbag 116 in the inflated position extends upward and backward toward the seatback 42. The first airbag 116 in the inflated position crosses the plane P when the front armrest portion 66 is in the deployed position. When inflating from the uninflated position to the inflated position, the first airbag 116 pushes the inboard panel 112 and the top panel 110 to the deployed position. The first airbag 116 in the inflated position is disposed between the seatback 42 and the outboard panel 108, the top panel 110, and the inboard panel 112. The outboard panel 108, the top panel 110, and the inboard panel 112 serve as a reaction surface for the first airbag 116.

The second airbag 118 is inflatable from an uninflated position to an inflated position. The second airbag 118 in the uninflated position is disposed in the front armrest portion 66 and covered and concealed by the panels 106, 108, 110, 112 of the first armrest portion. The second airbag 118 in the inflated position extends upward and backward toward the seatback 42. The second airbag 118 in the inflated position crosses the plane P when the front armrest portion 66 is in the deployed position. When inflating from the uninflated position to the inflated position, the second airbag 118 pushes the inboard panel 112 and the top panel 110 to the deployed position. The second airbag 118 in the inflated position is disposed between the seatback 42 and the outboard panel 108, the top panel 110, and the inboard panel 112. The outboard panel 108, the top panel 110, and the inboard panel 112 serve as a reaction surface for the second airbag 118. The second airbag 118 in the inflated position is disposed in front of the first airbag 116 in the inflated position relative to the seatback 42; in other words, the second airbag 118 in the inflated position is disposed in a direction away from the seatback 42 parallel to the plane P from the first airbag 116, i.e., in the forward direction F from the first airbag 116.

The airbags 116, 118 may be formed of any suitable airbag material, for example, a woven polymer. For example, the airbags 116, 118 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The seat 38 includes two airbag inflators 120, one fluidly connected to the first airbag 116 and one fluidly connected to the second airbag 118. Upon receiving a signal from, e.g., a controller 122, the airbag inflators 120 may inflate the airbags 116, 118 with an inflatable medium, such as a gas. The airbag inflators 120 may be, for example, pyrotechnic inflators that use a chemical reaction to drive inflation medium to the airbags 116, 118. The airbag inflators 120 may be of any suitable type, for example, cold-gas inflators.

The controller 122 is a microprocessor-based controller. The controller 122 includes a processor, memory, etc. The memory of the controller 122 includes memory for storing instructions executable by the processor as well as for electronically storing data and/or databases.

The controller 122 may transmit and receive data through a communications network 124 such as a controller area network (CAN) bus, Ethernet, WiFi, Local Interconnect Network (LIN), onboard diagnostics connector (OBD-II), and/or by any other wired or wireless communications network. The controller 122 is in communication with the armrest inflators 102, the airbag inflators 120, and an impact sensor 126 via the communications network 124.

The impact sensor 126 is adapted to detect an impact to the vehicle 30. The impact sensor 126 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 126 may be located at numerous points in or on the vehicle 30.

Figure 13:
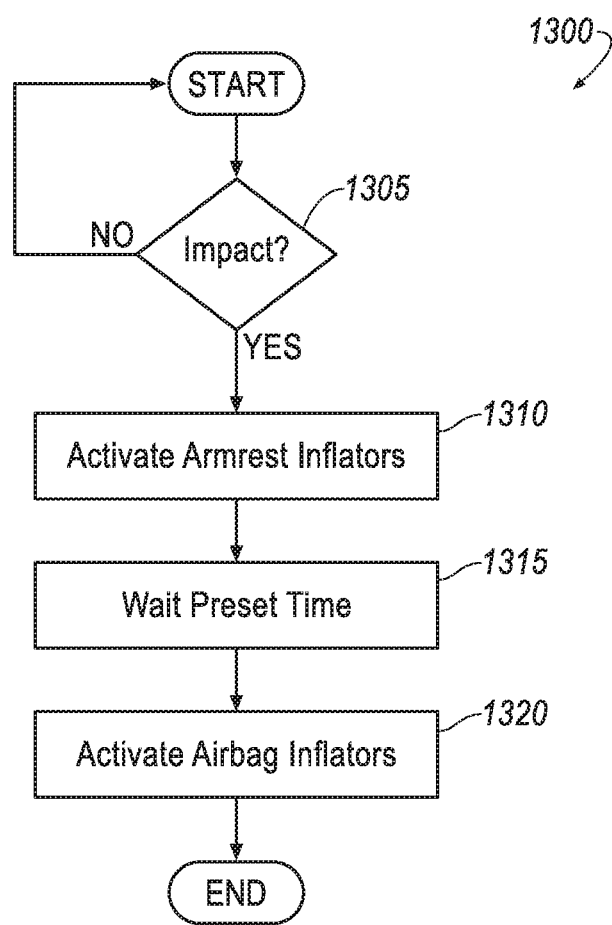
FIG. 13 is a process flow diagram of a process for deploying the armrest portions and inflating the airbags.

FIG. 13 is a process flow diagram illustrating an exemplary process 1300 for deploying the front armrest portions 66 and inflating the airbags 116, 118 in response to an impact. The controller 122 is programmed to perform the steps of the process 1300; in other words, the memory of the controller 122 stores executable instructions for performing the steps of the process 1300.

The process 1300 begins in a decision block 1305, in which the controller 122 determines whether the controller 122 has received data from the impact sensor 126 indicating that an impact has occurred. If the controller 122 has not received data indicating an impact, the process 1300 starts over.

If the controller 122 has received data indicating an impact, next, in a block 1310, the controller 122 instructs the armrest inflators 102 via the communications network 124 to discharge, that is, discharge the charges 104, pushing the front armrest portions 66 to the deployed position.

Next, in a block 1315, the controller 122 waits for a preset time. The preset time is a value stored in the memory of the controller 122. The preset time may be chosen to be substantially the amount of time to allow the front armrest portions 66 to move into the deployed position. "Substantially" as used herein means that a dimension, time duration, shape, or other adjective may vary slightly from what is described due to physical imperfections, power interruptions, variations in machining or other manufacturing, etc.

Next, in a block 1320, the controller 122 instructs the airbag inflators 120 to discharge via the communications network 124. The controller 122 may instruct both airbag inflators 120 to discharge at the same time, or the controller 122 may instruct one of the airbag inflators 120 to discharge and then instruct the other of the airbag inflators 120 to discharge after a preset delay. The preset delay may be chosen so that the second airbag 118 inflates farther from the seatback 42 than the first airbag 116.

The airbags 116, 118 may cushion 58 an occupant of the seat 38 during the impact and may reduce injuries to the occupant. The cushioning from the airbags 116, 118 may occur regardless of the orientation of the seat 38 relative to the passenger cabin 32. The crossing of the airbags 116, 118 in opposite directions across the plane P may hold the occupant in the seat 38. The airbags 116, 118 may push the occupant down against the seat bottom 44, helping the anti-submarining ramp 56 to prevent the occupant from sliding out of the seat 38.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat comprising:
   a seatback;
   two armrest portions, each rotatably coupled to the seatback about a generally vertical axis from a stowed position elongated in a forward direction to a deployed position extending in front of the seatback; and
   two airbags each fixed to one of the armrest portions and inflatable to an inflated position in which one of the airbags is disposed in front of the other of the airbags relative to the seatback.

2. The seat of claim 1, wherein the armrest portions are front armrest portions, further comprising two back armrest portions fixed relative to the seatback, wherein each front armrest portion is rotatably coupled to one of the back armrest portions.

3. The seat of claim 1, further comprising two inflators, each positioned to rotate one of the armrest portions to the deployed position upon discharge.

4. The seat of claim 3, wherein the inflators include a first inflator and a second inflator, the seat further comprising a piston cylinder and a piston head disposed in the piston cylinder, wherein a gas-expansion chamber is enclosed by the piston head and the piston cylinder, and the inflator is disposed in the gas-expansion chamber.

5. The seat of claim 4, further comprising a sleeve slidably disposed in the piston cylinder, wherein the piston head is slidably disposed in the sleeve.

6. The seat of claim 5, wherein the gas-expansion chamber is enclosed by the sleeve and the piston head.

7. The seat of claim 5, wherein the sleeve includes a first end face and a second end face spaced from the first end face, and the gas-expansion chamber is disposed between the piston head and the first end face.

8. The seat of claim 7, wherein the piston head is coupled to one of the armrest portions, and a position of the piston head relative to the piston cylinder corresponds to a position of the one of the armrest portions relative to the seatback.

9. The seat of claim 4, wherein the armrest portions include a first armrest portion and a second armrest portion, the seat further comprising a piston rod fixed to the piston head and rotatably coupled to the first armrest portion.

10. The seat of claim 4, wherein the piston cylinder is rotatably coupled to the seatback.

11. The seat of claim 3, wherein the armrest portions are rotatable between the stowed position and the deployed position without discharging the inflators.

12. The seat of claim 3, wherein the inflators are armrest inflators, the seat further comprising airbag inflators each fluidly connected to one of the airbags, and a controller in communication with the armrest inflators and the airbag inflators.

13. The seat of claim 12, wherein the controller is programmed to instruct the armrest inflators to discharge and to instruct the airbag inflators to discharge at a preset time after the armrest inflators discharge.

14. The seat of claim 1, wherein each armrest portion includes a bottom panel, an outboard panel, a top panel, and an inboard panel, and the top panel and outboard panel are hingedly coupled for each armrest portion.

15. The seat of claim 14, wherein the inboard panel and the top panel are hingedly coupled for each armrest portion.

16. The seat of claim 15, wherein the inboard panel and the bottom panel are releasably connected for each armrest portion.

17. The seat of claim 16, wherein the top panel and the inboard panel are each rotatable from an undeployed position to a deployed position.

18. The seat of claim 17, wherein the top panel and the inboard panel each have a rotational range of motion, and each range of motion stops at the deployed position.

19. The seat of claim 1, further comprising two stops fixed relative to the seatback, wherein each armrest portion includes a cutout engaged with one of the stops.

20. The seat of claim 19, wherein the cutouts are sized to permit the armrest portions to rotate between the stowed position and the deployed position and to stop the armrest portions from rotating past the stowed position and past the deployed position.

* * * * *